Feb. 10, 1942.  W. J. MILLER  2,272,421
CONVEYER FOR ELEVATING AND TRANSPORTING DUTY
Filed Feb. 13, 1939
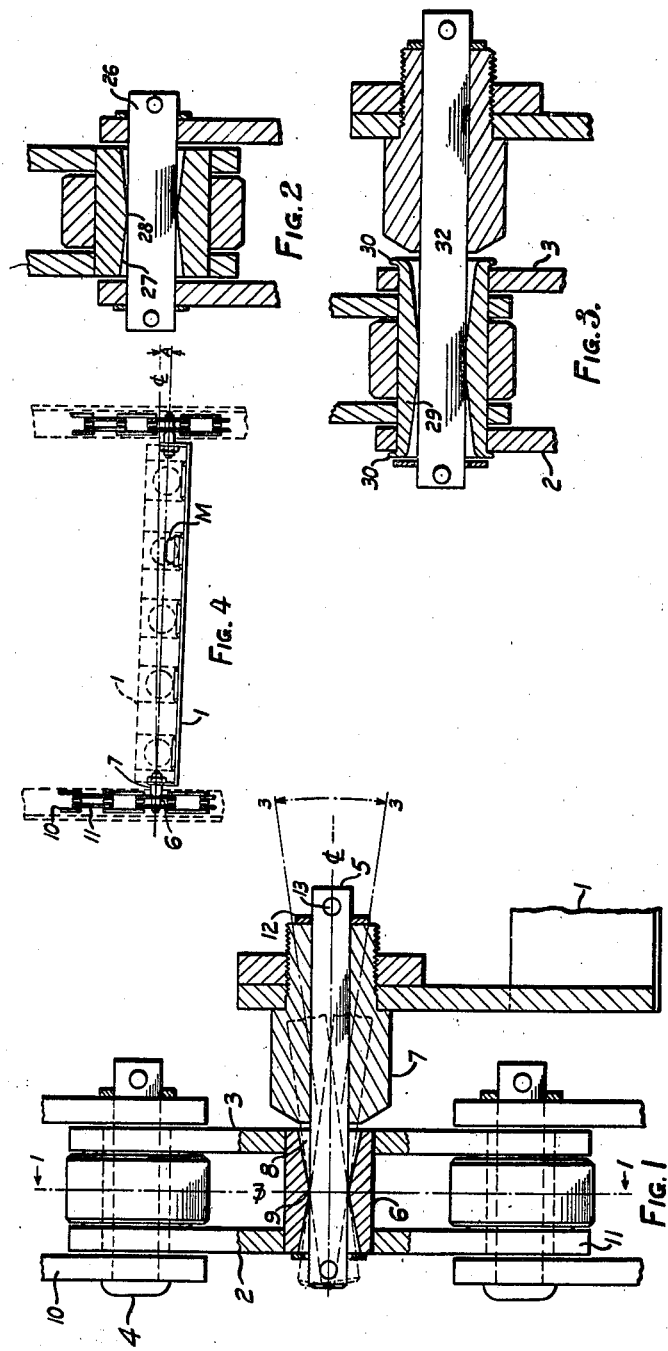
INVENTOR
WILLIAM J. MILLER
BY George J. Croninger
ATTORNEY

UNITED STATES PATENT OFFICE 2,272,421

CONVEYER FOR ELEVATING AND TRANSPORTING DUTY

William J. Miller, Swissvale, Pa.

Application February 13, 1939, Serial No. 256,154

3 Claims. (Cl. 198—158)

This invention relates to improvements in conveyers for elevating and transporting duty. It has to do with double strand conveyers comprising articulated links, having a series of carriers arranged transversely of and pivotally supported above the center of gravity thereof between chain strands to maintain them always on a horizontal plane.

In conventional double strand conveyers for elevating and transporting duty, the chain strands travel over sprockets acting as primary supporting means and on tracks in horizontal or inclined courses between sprockets. The carriers are usually suspended from the inner ends of elongated opposed pins passing through the articulation joints or from some appurtenance secured to the chain side bars. In horizontal courses, the weight of the carriers is concentrated on inner opposing side members of each chain strand, thereby tending to twist the chain longitudinally. In vertical courses, the carriers tend to cramp the links out of plumb or alignment with the sprocket teeth. In curved portions of the path, as where the chains travel in vertical courses over sprockets, there is apt to be relative movement between chain strands, particularly if the load is concentrated more on one strand than the other. Thus, pins and bushings, whether they are associated with the carriers or located at the chain articulation joints, will at some time or other be subjected to abnormal pressure concentrations due to twisting, cramping or shifting of the chain links. As a consequence, they may wear rapidly, thus shortening the life of the chain. Furthermore, if the trunnions bind in the bushings when the conveyer chains are in curvature, as for instance where they pass over sprockets, the carriers may be tilted or even capsized and the load spilled and misalignment of the chain links may cause the chains to ride the sprocket teeth and be thrown off.

One object of this invention is to provide a conveyer composed of spaced parallel chains wherein the means for fastening the chain links together will permit limited universal movement between adjacent chain links to thereby prevent binding and reduce wear. Another object is to provide means for supporting the carriers between chain strands whereby individual links of the chains will not be forced out of alignment if one chain should tend to lead or lag relative to the other chain, particularly when the conveyer is in curvature, as in passing over sprockets. Another object is to insure free rotation of articulation pins and carrier pins in their bushings and to centralize the load on the bushings, whether it be a carrier load or the pull on a conveyer chain. A further object is to prevent carriers from capsizing at points where they are carried around sprockets.

Other objects and advantageous features will be hereinafter noted in the following detailed description and drawing wherein like reference characters designate corresponding parts and wherein:

In the drawing, Fig. 1 is a sectional elevation of a portion of chain strand showing my novel improvements in a mid-pitch mounting for the carrier.

Fig. 2 is a sectional elevation showing the novel improvements incorporated at an articulation joint, and Fig. 3 shows means for suspending a tray from an articulation joint.

Fig. 4 is a side elevation of a vertically travelling double strand conveyer with a mold carrier attached thereto by means of the bushing and pin shown in Fig. 1, the view illustrating how the position of the carrier may deviate from an angle of 90° relative to the chain strands without deflecting the individual links of either strand. The dotted line showing illustrates horizontal travel.

One method of concentrating the weight of the carrier on the center line of each respective chain strand is shown in Figure 1, wherein the carrier 1 is suspended from transversely opposed chain links, Fig. 4, each comprising side bars 2 and 3 connected by hinge pins 4 to the next adjoining chain link. The connection between the carrier and the chain link is made by trunnions 5, which are fastened to the sides of the tray above the center of gravity and project through bored bosses 7 into mid-pitch bushings 6.

The trunnion 5 is seated in the bore 8 of bushing 6 on an edged surface, which takes the form of an annular (360°) ridge 9 located on the longitudinal center line 1—1 of the chain, Figs. 1 and 4. As shown, the ridge is formed by reducing the bore 8 of the bushings from each end toward the center where the two conical surfaces intersect, as illustrated, to form the annular edged portion or seat on which the trunnion 5 rests.

Each trunnion is free to rock or fulcrum angularly on the annular ridge 9 on which it rests (see dotted line position, Fig. 1) and may rotate relatively thereto, in order to allow the tray to remain in a horizontal plane as it passes around sprockets (not shown) or from vertical to horizontal courses. Each carrier trunnion, being free to move angularly with respect to the fulcrum, will permit the carrier to deviate from its normal 90° angular position relative to the chain strands in vertical, curved, or horizontal courses (see angle A, Fig. 4 and angle 3—3, Fig. 1) without cramping or binding the trunnion or chain links, or imposing eccentric loads on the strands of the conveyer. The tray trunnions 5 are secured against excess longitudinal displacement by washers 12 and pins 13.

In Fig. 3 I have shown how the improvements are adapted to mounting a carrier trunnion at the articulation joint. The bushing 29 is swaged at 30 at each end over the outside bars 2 and 3 to secure the bushing in place, and the inner side bars are pivotally connected thereto, the bushing taking the place of the conventional connection pin. The carrier trunnion 32 is then mounted and functions as in Fig. 1, thus relieving the articulation joint of torsional stresses, unavoidable in conventional mountings.

The present improvements are particularly advantageous in long conveyers, such as is conventionally employed for transporting the molds (see Fig. 4 and molds M) in automatic pottery making and drying machinery. Accumulated tolerances resulting from differences in the length of individual links, or in the diameter of holes and pins which may develop from wear, or may be inherent in the original construction, or arise from customary play of sprocket teeth in chain opening cause variation in transverse alignment of opposed bearing bores for the trunnions in parallel chain strands and allow variation in the normal 90° angle relation of the trunnions relative to the bore. In a chain provided with straight bushings, any skewing of the carriers will cramp or kink the chain. With the present improvements I am able to concentrate all loads on the center of the chain, both at the articulation joint and at the connection between the carrier and the chain. There is no eccentric load on the chain, either during elevating or horizontal conveying, and therefore no abnormal wear on the bushings or pins or shortening the life of the chain, and the chain is applied centrally to the sprockets, thereby avoiding the danger of the trunnions binding and overturning the trays.

With regard to Fig. 2, I have shown therein a preferred form of articulation joint utilizing my principle of center loading the weight on the centerline of the chain strand. In this instance the joint is made by an articulation pin 26 from which the side bars of the lower chain link are suspended and a bearing 27 to which the side bars of the upper chain link are attached. The articulation pin is held in place by washers and pins and is free to rock angularly on the edged annular fulcrum ridge 28 and rotate relative thereto, the ridge being located on the longitudinal centerline of the chain strand. In order to dampen side sway, resilient spacers may be inserted under the washers and caused to bear against the sides of the chain.

As is clearly indicated by the illustration, the clearance between the pin 26 and the inside of the bushing extends all around the bushing from the edged seat outwardly toward the ends of the bushing. Said clearance increases outwardly due to the tapers. Thus, as is clearly indicated, the joint will permit relative universal movement between adjacent chain links and will permit limited relative twisting of adjacent links and will also permit bending of one link relative to the other in the plane in which the chain lies, whether it be a level or a curved plane.

In a joint or connection of this description, whether it be used for attaching carriers to a conveyer or connecting adjacent chain links, the trunnion or pin will rest on an edged surface from which adjacent walls of the bushing fall away in straight lines. Thus, as the edge portion wears, the increase in bearing surface will be very small.

The term "mid-pitch bushing" as used herein means a bushing located in a link equi-distant from the ends of the link (or from the axes of the pintles).

Having thus described my invention, what I claim is:

1. In a mold conveyer, a pair of spaced chains made up of articulated links, mold carriers supported by said chains, means for attaching said mold carriers to said chains including bushings carried by said chain links located midway between adjacent chain joints, a bushing attached to said carrier and held against angular displacement relative thereto, a trunnion pin demountably disposed in said bushings, said chain bushing having an internal central annular 360° edged portion on which the trunnion rests, there being clearance between the trunnion and the bushing from this zone outwardly, the other bushing having a straight bore therethrough in which the trunnion rests.

2. The combination with a pair of spaced parallel sprocket chains composed of a plurality of connected links, a plurality of rigid carriers, means for joining the carriers to the chains including a hollow bushing and a trunnion therein, said bushing having internally an annular edged seat on which the trunnion rests formed by the intersection of two conical surfaces, there being clearance all around the trunnion increasing outwardly from the edged seat to the ends of the bushing to provide for relative longitudinal movement between chains in straight and curved portions without the trunnions binding in the bushings.

3. Apparatus according to claim 2 wherein the means for joining the carriers to the sprocket chains is located midway between chain joints.

WILLIAM J. MILLER.